United States Patent
Joyce et al.

(10) Patent No.: US 8,898,742 B2
(45) Date of Patent: *Nov. 25, 2014

(54) SYSTEMS AND METHODS FOR CONTROLLING ACCESS TO CONTENT DISTRIBUTED OVER A NETWORK

(75) Inventors: Raymond G. Joyce, Calabasas, CA (US); Damon Garrett, Simi Valley, CA (US); Frederick Huntsberry, Beverly Hills, CA (US); Randy Tunila, Manhattan Beach, CA (US)

(73) Assignee: Paramount Pictures Corporation, Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/270,914

(22) Filed: Oct. 11, 2011

(65) Prior Publication Data

US 2013/0091549 A1   Apr. 11, 2013

(51) Int. Cl.
*G06F 21/00*   (2013.01)

(52) U.S. Cl.
CPC ..................................... *G06F 21/00* (2013.01)
USPC ............ 726/4; 726/2; 726/3; 726/27; 726/28; 726/29; 726/30; 709/203; 709/217; 709/218; 709/219; 713/150; 713/161; 713/168; 713/169; 713/170

(58) Field of Classification Search
USPC ......... 713/164–167, 182–186, 153–154, 158, 713/150, 161, 168–170; 726/12–17, 26–30, 726/2–4; 709/203, 217–219
See application file for complete search history.

(56) References Cited

U.S. PATENT DOCUMENTS

| | | | |
|---|---|---|---|
| 6,185,684 B1 * | 2/2001 | Pravetz et al. | 713/182 |
| 7,136,903 B1 * | 11/2006 | Phillips et al. | 709/217 |
| 7,272,639 B1 * | 9/2007 | Levergood et al. | 709/218 |
| 7,571,486 B2 | 8/2009 | Lam | |
| 7,874,014 B2 * | 1/2011 | Maeda | 726/29 |
| 7,913,311 B2 | 3/2011 | Alain et al. | |
| 8,151,358 B1 * | 4/2012 | Herold | 726/27 |
| 2002/0112177 A1 * | 8/2002 | Voltmer et al. | 713/200 |
| 2002/0174010 A1 * | 11/2002 | Rice, III | 705/14 |
| 2002/0194470 A1 * | 12/2002 | Grupe | 713/153 |
| 2007/0198462 A1 * | 8/2007 | Ohta et al. | 707/1 |
| 2007/0208994 A1 * | 9/2007 | Reddel et al. | 715/512 |
| 2007/0245409 A1 * | 10/2007 | Harris et al. | 726/5 |
| 2008/0114797 A1 | 5/2008 | Jones et al. | |
| 2008/0155648 A1 * | 6/2008 | Chae et al. | 726/1 |
| 2009/0187535 A1 | 7/2009 | Warnock et al. | |

(Continued)

OTHER PUBLICATIONS

Carl Downing Tait, A File System for Mobile Computing, 1993, Columbia university.*

(Continued)

*Primary Examiner* — Josnel Jeudy
(74) *Attorney, Agent, or Firm* — Baker & McKenzie LLP

(57) ABSTRACT

A computer-implemented method is provided for controlling use of a file on a user device. The method includes transmitting authentication information to a system and downloading the file from the system over the network upon successful authentication by the system. The method also includes limiting access of the file to a client application of the user device and preventing altering of the file, printing of the file and opening of the file outside of the client application. Notes corresponding to the file can be stored in a local storage area.

20 Claims, 11 Drawing Sheets

(56) References Cited

U.S. PATENT DOCUMENTS

| | | | |
|---|---|---|---|
| 2010/0017701 A1 | 1/2010 | Bargeron et al. | |
| 2010/0257254 A1 | 10/2010 | Bhatnagar et al. | |
| 2011/0010397 A1 | 1/2011 | Kathpal | |
| 2011/0289401 A1 | 11/2011 | Fischer | |
| 2011/0289901 A1* | 12/2011 | Estes et al. | 60/274 |
| 2013/0132463 A1* | 5/2013 | Garcia-Ascanio et al. | 709/203 |

OTHER PUBLICATIONS

The International Search Report for PCT Application No. PCT/US12/59509, mailed on Nov. 13, 2012 (7 pgs.).

Antonio Lioy, Fabio Maino, and Marco Mezzalama, "Secure Document Management and Distribution in an Open Network Environment," Information and Communications Security, Lecture Notes in Computer Science, 1997, vol. 1334/1997, pp. 109-117.

Rick Scanlan, "Annotating PDFs in Web-Based ECM Systems . . . Without Altering the Original PDF," Pegasus Imaging Corporation, 2008, pp. 1-5.

Jack T. Brassil, Steven Low, and Nicholas F. Maxemchuk, "Copyright Protection for the Electronic Distribution of Text Documents," Proceedings of the IEEE, vol. 87, No. 7, Jul. 1999, pp. 1181-1196.

Elisa Bertino, Barbara Carminati and Elena Ferrari, "A Temporal Key Management Scheme for Secure Broadcasting of XML Documents," Proceedings of the $9^{th}$ ACM Conference on Computer and Communications Security, Nov. 18-22, 2002, pp. 31-40.

EMC Corporation, "View and Mark Up PDF Files to Promote Information Sharing and Collaboration," 2006, www.EMC.com, pp. 1-2.

Image Solutions, Inc., "Annodoc: Take Control of Your Content Review Process", http://www.imagesolutions.com/software/annodoc.html:, pp. 1-5, Jan. 27, 2012.

International Preliminary Report on Patentability, PCT/US2012/059509, mailed Apr. 24, 2014, 10 pages.

* cited by examiner

FIG. 5

SYSTEMS AND METHODS FOR CONTROLLING ACCESS TO CONTENT DISTRIBUTED OVER A NETWORK

FIELD OF THE INVENTION

The technology generally relates to systems and methods for distributing content over a network.

BACKGROUND OF THE INVENTION

Traditionally, sensitive documents have been printed on special paper that contains a physical watermark or electronically, e.g., as Portable Document Files (PDF), with an embedded digital watermark and accompanied by one or more access policies. Access policies control how a user can use the file. As an example, an access policy can allow the recipient to open the attached file only once before the policy is revoked, thus preventing the recipient from opening the file multiple times.

The paper distribution process is often costly and time-consuming. For example, to prepare for the distribution of four or five movie scripts to twenty readers to review over a weekend, a movie studio needs to replicate each script twenty times, bind each script, and hand deliver the scripts to each reader by the close of business on Friday before the weekend. On the following Monday, to ensure the scripts are not leaked to unauthorized third parties, the studio needs to collect and account for each of the scripts distributed.

Even though emailing scripts as PDF documents improves the distribution process, there are limitations with this form of distribution. Often the policies are managed by a policy server, and the policies embedded in the PDF documents require constant Internet connectivity to check with the policy server to ensure that the user is complying with the policy. Hence, this process is unreliable if a recipient does not have constant Internet access.

SUMMARY OF THE INVENTION

Systems and methods are needed for securely distributing documents to one or more user devices and providing flexible user access to the distributed documents while enforcing specific access rules. With the rise of electronic tablet devices, solutions are also needed to allow a recipient to access distributed documents on a portable electronic device that is smaller and lighter than a typical laptop, such as on an iPad. It would be also beneficial if feedback could be received from a recipient about the documents in a timely manner without allowing the user to alter the documents. In addition, it would be beneficial to allow an administrator to manage document distribution processes in a secure environment from any location at any time as well as receive documents from any location at any time.

According to the present invention, devices for receiving distributed documents need to satisfy several requirements including, but not limited to, being portable (i.e., small and light), have a large viewing screen, support wireless and manual document distribution processes, provide a software development kit (SDK) for customized application development and provide secure access to distributed documents.

Several distribution platforms, such as Netbooks, e-readers (e.g., Amazon Kindle) and computer tablets, can be configured to receive distributed documents. E-Readers and computer tablets are generally lighter, smaller and easier to handle than laptops or Netbooks, and their reading screens are larger than personal digital assistants (PDAs) or Smartphones. Between the e-readers and computer tablets, however, only the e-readers currently support both wireless and manual document distribution processes. Presently, none of these devices offer a SDK for custom application development. In addition, the e-readers present security risks. For example, the e-readers typically do not offer password protection for distributed documents, prevent documents from being downloaded to personal computers or prevent documents from being redistributed via electronic mailing or printed copies.

In contrast, the Apple iPad meets the basic requirements of a user device for receiving distributed documents. The iPads are portable and include a reading canvas that is larger than a PDA or Smartphone. The iPads also provide a SDK for custom application development. In certain embodiments of the present invention, a client application can be implemented on an iPad or a like device to provide a user secure access to distributed documents. The client application remedies shortcomings of existing document review applications, such as GoodReader or iAnnotate, which lack features for managing secure delivery of documents to and from user devices or capable of controlling use and share of documents after they are distributed.

In one aspect, the invention features a computer-implemented method for controlling use of a file on a user device. The method includes transmitting, by the user device, authentication information to a system. The authentication information includes an identifier of the user device and at least one form of identification of a user associated with the user device. The method also includes downloading, by the user device, the file from the system upon successful authentication by the system and limiting, by the user device, access of the file to a client application of the user device. The method further includes preventing, by the user device, altering of the file, printing of the file and opening of the file outside of the client application. In addition, the method includes storing, by the user device, notes corresponding to the file in a local storage area separate from the file, transmitting, by the user device, at least a portion of the notes to the system; and removing, by the user device, the file from the user device as instructed by the system.

In another aspect, the invention features a computer program product, tangibly embodied in a non-transitory computer readable medium, for controlling use of a file on a user device. The computer program product includes instructions being operable to cause data processing apparatus to transmit authentication information to a system. The authentication information includes an identifier of the user device and at least one form of identification of a user associated with the user device. In addition, the computer program product includes instructions being operable to cause data processing apparatus to download the file from the system upon successful authentication by the system, limit access of the file to a client application of the user device, and prevent altering of the file, printing of the file and opening of the file outside of the client application. Furthermore, the computer program product includes instructions being operable to cause data processing apparatus to store notes corresponding to the file in a local storage area separate from the file.

In yet another aspect, the invention features a user device for controlling use of a file disposed on the user device. The user device includes a client application that has an authentication module for transmitting authentication information to a system. The authentication information includes an identifier of the user device and at least one form of identification of a user associated with the user device. The authentication module is adapted to download the file from the system upon successful authentication by the system. The client application also includes a reader module for limiting access of the file to the client application. The reader module prevents altering of the file, printing of the file and opening of the file outside of the client application. The client application additionally includes a notes module for storing notes corresponding to the file in a local storage area. The client application further includes a sharing module for permitting the user to designate the file for sharing with a second user. The user and the second user are in a group defined by the system and the file has not been previously assigned.

In other examples, any of the aspects above can include one or more of the following features. In some embodiments, the system is adapted to instruct the user device to remove the file after detecting expiration of a time period associated with the file. In some embodiments, the system is adapted to instruct the user device to remove the file when access privilege of the user in relation to the file is revoked by an administrator of the system.

In some embodiments, the user device transmits at least a portion of the notes to the system after the system detects expiration of a time period associated with the file. In some embodiments, the user device transmits at least a portion of the notes to the system as instructed by the user.

In some embodiments, the user device can store the file in a first folder of the local storage area if the file is assigned to the user device by an administrator of the system. Alternatively, the user device can store the file in a second folder of the local storage area if the file is shared with the user by a second user. The user and the second user can belong to the same group defined by the system.

In some embodiments, the user device permits the user to designate the file for sharing with a second user. The user and the second user can belong to the same group defined by the system and the file has not been previously assigned. In addition, the user device is adapted to transmit at least one of an identification of the second user or an identification of the predefined group to the system such that the system is enabled to send the file to the second user.

In some embodiments, when the user device is disconnected from the system, the user device authenticates at least one form of identification of the user and, upon successful authentication, permits the user to access a locally-stored copy of the file.

In some embodiments, the user device is an iPad. In some embodiments, the file is in a portable document format (PDF).

In another aspect, the invention features a system for controlling use of a file on a user device. The system includes a services module, in communication with the user device, for performing: i) authenticating the user device and one or more user credentials of a user associated with the user device, ii) sending a file to the user device, iii) receiving at least a portion of notes from the user device corresponding to the file, and iv) removing the file from the user device upon expiration of a time period associated with the file or when access privilege of the user in relation to the file is revoked by an administrator. The system also includes an application module for managing the file and an account of the user.

In some embodiments, the application module manages the account of the user by performing at least one of: activating the account, setting an identification of the account, generating a watermark associated with the account, locking the account, or deactivating the account.

In some embodiments, the application module manages the file by performing at least one of: uploading the file to a database in communication with the system, assigning the file to the user, assigning the file to a group of users, revoking access privilege of the user in relation to the file, revoking access privilege of a group of users in relation to the file, or setting the time period associated with the file.

In some embodiments, the application module can aggregate notes from multiple users corresponding to the file and generate a report for the file that includes the aggregated notes. The report is generated without altering the file.

In some embodiments, the application module is further configured to manage a group of users by performing at least one of: creating the group, assigning the user to the group, removing the user from the group, or deleting the group. The application module can prevent the user from sharing the file with a second user if the second user is not in the same group as the user or the file has been previously assigned.

In some embodiments, the application module is further configured to manage roles of users by performing at least one of: creating a role, defining the role, assigning the role to a user, removing the role from the user, or deleting the role. The application module can prevent the user from sharing the file with a second user if the first user's role is not defined as a sharing role.

In some embodiments, the user device is an iPad. In some embodiments, the file is in a portable document format (PDF).

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the technology described above, together with further advantages, may be better understood by referring to the following description taken in conjunction with the accompanying drawings. The drawings are not necessarily to scale, emphasis instead generally being placed upon illustrating the principles of the technology.

FIG. 5 shows another exemplary administrator interface of the administration system of FIG. 1.

DETAILED DESCRIPTION OF THE INVENTION

Figure 1:
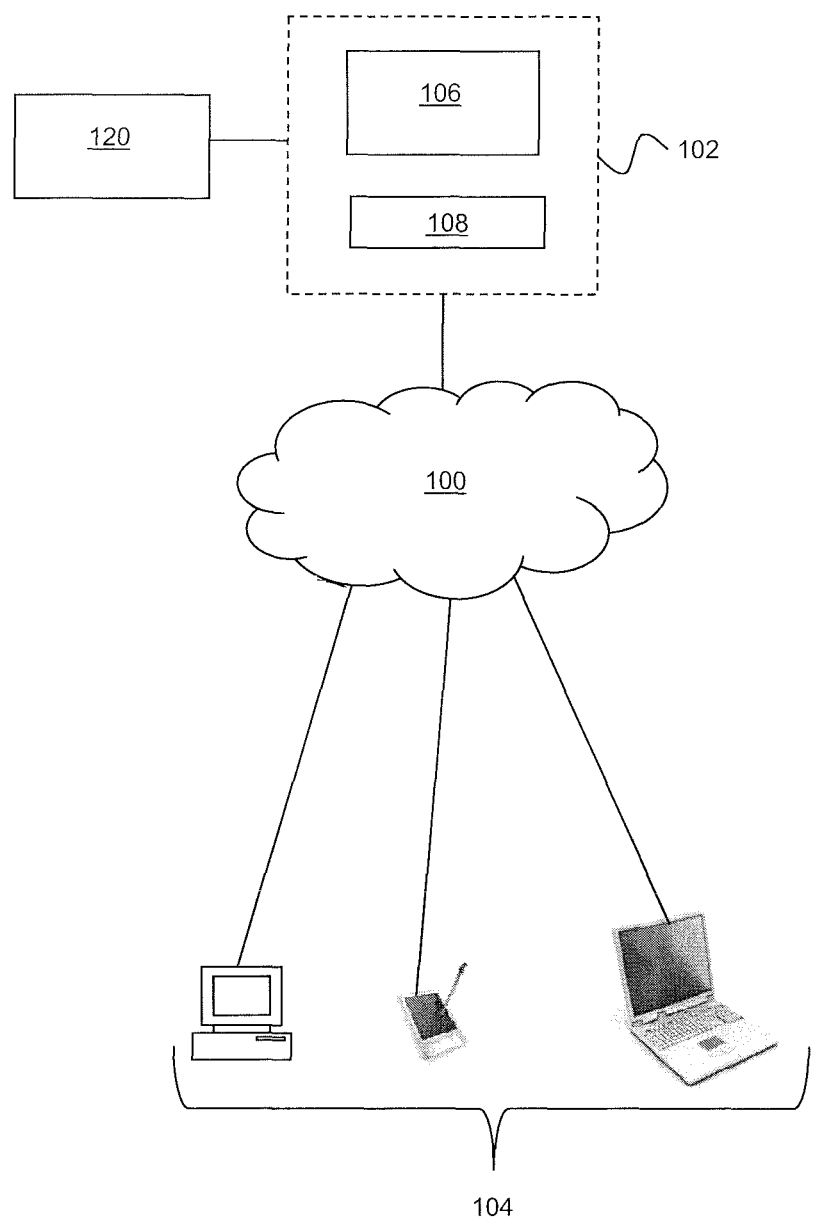
FIG. 1 shows an exemplary network environment according to some embodiments of the technology.

FIG. 1 shows an exemplary network environment according to some embodiments of the technology. The network environment includes an administration system 102 and one or more user devices 104. The administration system 102 can securely assign, manage and monitor delivery of documents to any of the user devices 104 and provider user account and document management functions. A client application installed on each of the user devices 104, such as client application 200 illustrated in FIG. 2, allows a user associated with the user device 104 to download assigned documents from the administration system 102, open the documents in read-only mode, add notes associated with the documents that can be edited, emailed, printed or submitted to the administration system 102, and share the documents under controlled conditions. In certain embodiments, the administration system 102 can communicate with the user devices 104 over an IP network 100 such as a LAN, WAN, cellular network, or the Internet. However, communication over the IP network 100 is not required in all embodiments. For example, in some embodiments, communications occur over network protocols other than Internet Protocol (IP). In some embodiments, communications occur over infrared transmission systems, Blue Tooth or Personal Area Networks (PANs).

The administration system 102 includes a services module 106 and an application module 108 for securely managing and monitoring delivery of documents to any one of the user devices 104 registered with the administration system 102. In some embodiments, either the services module 106 or the application module 108 (or both) communicates with a database 120 configured to store the documents. For the purposes of illustration, the database 120 is shown to reside outside of the administration system 102. In other embodiments, however, the database 120 can be a part of the administration system 102. As an example, a business enterprise, such as a movie studio, can control and operate the administration system 102 to distribute movie scripts to select readers associated with one or more of the user devices 104. In some embodiments, the administration system 102 and the database 120 are behind a firewall (not shown) for protecting data transmissions within the business enterprise. In some cases, the user devices 104 may also be behind the firewall. Alternatively, in embodiments where the devices are connecting to the administration system 102 via the Internet, the user devices 104 utilize data tunneling software or a Virtual Private Network (VPN) to connect through the firewall to access to the administration system 102.

Each of the user devices 104 can be a computing device operated by a user. A computing device refers to any device with a processor and memory that can execute instructions. Computing devices include, but are not limited to, personal computers, server computers, portable computers, laptop computers, personal digital assistants (PDAs), e-Readers such as the Amazon Kindle, cellular telephones, e-mail clients, tablets and other mobile devices. In some embodiments, a user device 104 is smaller and lighter in weight than a laptop and has a screen that is larger than a PDA or a smart phone, such as an iPad. In some embodiments, a user device 104 offers wireless connection to the administration system 102, and the device's manufacturer provides a SDK for customized application development. For example, each of the user devices 104 can include a client application, such as the client application 200 illustrated in FIG. 2, for allowing a user to download documents from the administration system 102 and controlling user access to the downloaded documents in compliance with specific access rules.

In some embodiments, the documents distributed by the administration system 102 are PDF documents. The documents can also be in other electronic formats, such as Microsoft Word, PowerPoint, Excel, Project, Visio, .mobi, ePub, Text, jpeg, png, bmp or the like. Each document can embed a personal watermark associated with the user to whom the document is distributed. As an example, the watermark is generated using PdfReader and PdfStamper classes of iText, which is an open source PDF library in Java and C#.

In various embodiments, the client application 200 or the administration system 102 can be implemented as a computer program product, i.e., a computer program tangibly embodied in a non-transient machine-readable storage device, for execution by, or to control the operation of, a data processing apparatus. The computer program can be written in any form of computer or programming language, including source code, compiled code, interpreted code, scripting code (e.g., Javascript) and/or machine code, and the computer program can be deployed in any form, including as a stand-alone program or as a subroutine, element, or other unit suitable for use in a computing environment.

In various embodiments, the user devices 104 and the computing device on which the administration system 102 is implemented include processors suitable for the execution of a computer program. The processors include, by way of example, both general and special purpose microprocessors, which may be sold by companies such as Intel, AMD or Qualcomm. The processors can receive instructions and data from a read-only memory or a random access memory or both. Memory devices, such as a cache, can be used to temporarily store data. Memory devices can also be used for long-term data storage.

In various embodiments, the user devices 104 and the computing device on which the administration system 102 is implemented can receive data from or transfer data to one or more storage mediums. In general, computer-readable storage mediums, such as the database 120, include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. In addition, the devices can be operatively coupled to a communications network, such as network 100, to receive instructions and/or data from the network and/or to transfer instructions and/or data to the network.

In various embodiments, the user devices 104 or the computing device on which the administration system 102 is implemented communicate with a display device, e.g., a CRT (cathode ray tube), plasma, LED (light emitting diode), or LCD (liquid crystal display) monitor, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

In various embodiments, the network 100 is a transmission medium that facilitates any form or medium of digital or analog communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, Wi-Fi, WiMAX, general packet radio service (GPRS) network, HiperLAN), optical fiber, satellite and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), infrared transmissions, Blue Tooth or Personal Area Networks (PANs), Near Frequency Communication (NFC) network, and/or other circuit-based networks.

Information transfer over the network 100 can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, a Real-time Messaging protocol (RTMP), a Real-time Media Flow Protocol (RTMFP) and/or other communication protocols.

The Administration System

The administration system 102 includes two modules, the services module 106 and the application module 108. In some embodiments, the services module 106 performs the following exemplary functions: i) authenticating a user device 104 and user credentials associated with the user device 104, ii) assigning and transmitting a document to an authenticated user device 104, iii) retrieving notes associated with a document from a user device 104, and iv) sending an instruction to a user device 104 to remove a document. In some embodiments, the application module 108 performs the following exemplary functions: i) user account management, ii) user group management, iii) document management, iv) organize notes submitted by user device 104 for one or more documents, and v) monitoring user activities on one or more user device 104, such as keeping a log of which documents have been opened and which pages have been reviewed.

In one exemplary embodiment, the services module 106 of the administration system 102 is designed to communicate with the client application 200 installed on a user device 104. Prior to distributing a document to a user device 104, the services module 106 authenticates a user of the user device 104 by comparing authentication information provided by the user via the user device 104 with reference information about the user stored in the database 120. In an exemplary embodiment, the authentication information includes the identifier of the user device 104 and at least two forms of user identification. The device identifier can be, for example, the physical device ID of the user device 104. The user identifications can include a user name and a corresponding pin, such as a personal identification number, assigned to the user by the administration system 102. In some embodiments, the administration system 102 authenticates a user based on the device identifier and one or more user identifications issued by the administration system 102.

In one exemplary embodiment, the services module 106 can transmit one or more documents to the client application of the user device 104 upon successful authentication. Prior to transmission of a document, the document can be assigned to the user by an administrator or shared with the user by another user. After transmission of the document, the user is able to annotate the document using the client application 200 to create notes about the document. The services module 106 can receive the notes from the user device 104 and store the notes in the database 120. In some embodiments, the notes are stored with a reference to the document and the user who created the notes (document-user-centric notes). The services module 106 can also instruct the user device 104 to remove a document from the user device 104 based on one or more removal criteria provided by the administration system 102, such as removing the document following the expiration of a time period associated with the document. For example, the services module can instruct the user device 104 to delete the document two (2) days after it is downloaded to the user device 104. In some embodiments, the services module 106 can instruct the user device 104 to remove a document at the direction of a system administrator, who may also revoke a user's access privilege in relation to the document for any reason. Furthermore, the services module 106 can enforce one or more security rules of the administration system 102, such as internal company rules for compliance with the Sarbanes-Oxley Act (SOX) that require a password for accessing the administration system 102 to be changed on a periodic basis.

In one exemplary embodiment, the application module 108 of the administration system 102 can be a web application (in some cases, secured using the https protocol) that enables an administrator to access the application module 108 from any personal computer with Internet access. The application module 108 manages the account of one or more registered users of the administration system 102. Some of the management activities include, for example, activating new users, resetting user identifications, automatically generating personal watermarks, locking a user account and deactivating a user account. In some embodiments, the application module 108 registers at least one user device 104 associated with a user. When distributing documents to the user, the application module 108 only transmits the documents to the registered user device 104. In some embodiments, the application module 108 manages user roles by, for example, creating role(s), defining role(s), assigning role(s) to a user, removing role(s) from a user, or deleting role(s). The application module 108 can prevent a user from sharing a document with another user if, for example, the first user's role is not defined as a sharing role. Furthermore, the application module 108 can also manage one or more user groups. Some group management functions include, for example, creating group designations, assigning user(s) to a group, removing user(s) from a group, deleting a group designation altogether, assigning document(s) to a group or removing document(s) from a group.

In some embodiments, the application module 108 manages documents for distribution purposes. Specifically, the application module 108 can facilitate the uploading of a document by an administrator and store the document in the database 120. The application module 108 can assign a document to be distributed to one or more designated users via their respective user devices 104 registered with the administration system 102. Designated users can be individual users or a group of users. The application module 108 can also set one or more criteria for removing a document from a user device 104 prior to distributing the document to the user device 104, such as set an expiration date for the document, thereby allowing the document to reside on the user device 104 only for the duration of the time period. In addition, the application module 108 can remove a document that is already assigned to a user or a group of users, but has not been distributed to the corresponding user device(s) 104. Furthermore, the application module 108 can generate a report associated with a document by aggregating notes about the document collected via the associated user devices 104.

In addition to managing document distribution within a single department or a group within an organization, the administration system 102 can manage concurrent document distribution processes for multiple departments. A department in the administration system 102 typically includes multiple users and multiple user groups. Some of the users can be administrators of the department. The administrators can be further organized into one or more user groups associated with the department. The departments are controlled by a super administrator who can add, edit or remove the departments in the administration system 102. The super administrator can also add, edit or remove department user groups. The super administrator can further remove department users or edit department users, such as assign department users to department user groups. In some embodiments, once the super administrator has created a new department in the administration system 102, added new users to the department, assigned administrator role to at least one of the users and set up one or more user groups for the department, the department can be intelligently run by the administration system 102 without much intervention from the super administrator.

Client Application

Figure 2:
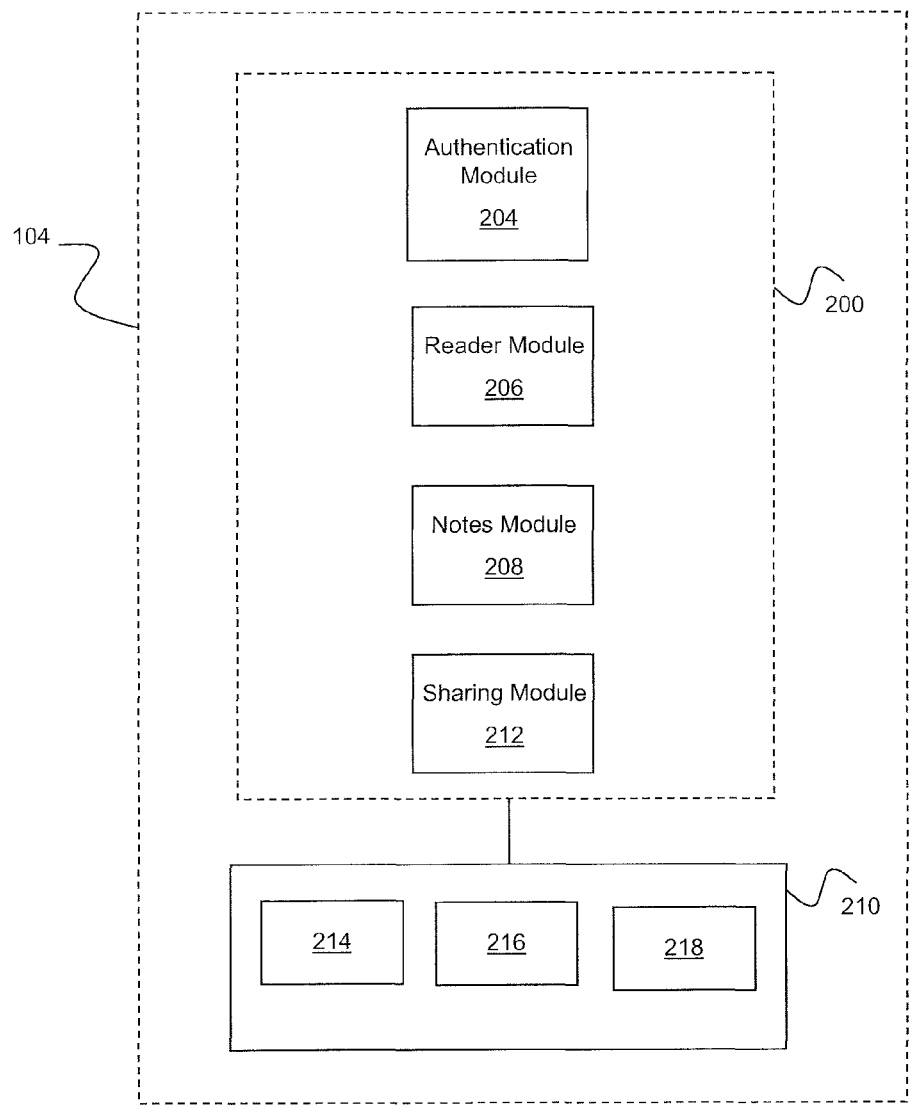
FIG. 2 shows an exemplary architecture of a client application installed on a user device of FIG. 1.

FIG. 2 shows an exemplary architecture of a client application 200 installed on a user device 104 of FIG. 1. In some embodiments, the client application 200 can work in both online and offline modes. When in the online mode, the client application 200 can authenticate a user with the administration system 102 by transmitting to the administration system 102 the physical device identifier of the user device 104 and the user identification(s). Upon successful authentication, the administration system 102 can interact with the client application 200 to perform functions such as removal of a document from the client application 200, retrieval of notes associated with a document from the client application 200, and transmission of newly-assigned or newly-shared documents to the client application 200. When operating in the offline mode, the client application 200 can authenticate a user locally based on the user identification(s). Upon successful authentication, the client application 200 operates independently from the administration system 102 by making available to the user only previously downloaded documents.

In some embodiments, the client application 200 can allow a user to read the downloaded documents without permitting the user to embed notes in the documents. The client application 200 can also prohibit document printing and emailing or opening of the documents using other applications on the user device 104. The client application 200 can allow a user to add notes to the documents, which are stored separately from the documents. The notes can be transmitted to the administration system 102 after the associated documents expire or when the user chooses to submit them prior to the expiration of the associated documents.

In some embodiments, the client application 200 allows a user to share his documents with one or more other users, subject to certain restrictions, such as the document can only be shared once. In some cases, the shared documents do not include any notes. The recipient has the ability to add his own notes and submit the notes to the administration system 102.

As shown in FIG. 2, the client application 200 includes an authentication module 204, a reader module 206, a notes module 208, and a sharing module 212. The client application 200 communicates with a local storage area 210 of the user device 104, which can be a part of the client application 200 or located outside of the client application 200.

The authentication module 204 of the client application 200 is configured to authenticate a user when the user requests access to a document. In an offline mode, the authentication module 204 performs authentication of a user without communication with the administration system 102. In an exemplary embodiment, the authentication module 204 authenticates the user locally based on at least two user-supplied identifications, such as the user name and user pin issued by the administration system 102. After successful authentication, the user is permitted to access all documents previously downloaded from the administration system 102 and stored in the local storage area 210. Therefore, in the offline mode, the client application 200 operates independent of the administration system 102.

The authentication module 204 can also operate in an online mode, during which the authentication module 204 transmits authentication information of a user to the administration system 102 over the network 100 using, for example, a Wi-Fi or cellular network data connection, e.g., Edge, 3G, 4G, and the like. The authentication information supplied by the authentication module 204 can include the physical device identifier of the user device 104 and/or the user name and pin issued by the administration system 102. In some embodiments, the administration system 102 needs to match all three pieces of information—the physical device identifier, user name and user pin—before instructing the client application 200 to give the user document access privilege. Therefore, in both the online and offline modes of communication, user access to a distributed document is limited to the user device 104 registered to the user.

Furthermore, in the online mode of operation, the administration system 102 can perform additional tasks on the user device 104 after a user is successfully authenticated. In some embodiments, the administration system 102 interacts with the database 120 to determine whether one or more removal criteria are satisfied, such as whether there are any expired documents stored in the local storage area 210. In some cases, a system administrator may revoke a user's right to access a document for any reason. If an expired or revoked document is detected, the administration system 102 instructs the client application 200 to submit any notes stored in the local storage area 210 corresponding to the document. In addition, the administration system 102 can send an instruction to the client application 200 to delete the expired or revoked document. In some embodiments, the administration system 102 interacts with the database 120 to determine whether there are any documents that are newly assigned to or shared with the user device 104 and have not been distributed to the user device 104. If a newly-assigned or newly-shared document is detected, the administration system 102 transmits the document to the client application 200 over a secured or non-secured connection. Hence, in the online mode of operation, a user is able to access both previously-downloaded documents and newly-assigned or newly-shared documents.

The client application 204, upon receiving a document from the administration system 102, can save the document in a folder of the local storage area 210. The local storage area 210 can be a secure Binary Large Object (blob) field in a local database, such as SQLite with the database designed to prevent an intruder from exporting documents stored in the database. In one example of preventing an intruder from exporting documents from the database, the database may render the documents unreadable to an unauthorized user.

In some embodiments, if the document is assigned to the user device 104 of an intended recipient by the administration system 102 and the document is not shared with the intended recipient by another user of the administration system 102, the client application 200 stores the document (herein referred to as an "assigned document") in an assigned folder 214 of the local storage area 210. In some embodiments, if the document is shared with the user device 104 of the intended recipient by another user of the administration system 102 and the document has not been previously assigned to or shared with the intended recipient, the client application 200 stores the document (herein referred to as a "shared document") in the shared folder 216 of the local storage area. The user who chooses to share the document can be a registered user of the administration system 102 who has sharing privileges, such as a super user or an administrator, and who is in the same group as the intended recipient. In some embodiments, if the document is shared with the user device 104 of the intended recipient by another user of the administration system 102 and the document was previously assigned to the intended recipient prior to the sharing, the client application 200 does nothing since the document is already stored in the assigned folder 214 of the local storage area 210. In some embodiments, a document is stored in a My Documents folder 218 of the local storage area 210. The My Document folder 218 can include documents that are added by the user via a mail program or another application on the user device 104. Hence, the client application 200 can be used to read other sources of documents, in addition to the documents transmitted by the administration system 102.

The client application 200 also includes a sharing module 212 for determining whether a user can share an assigned document with another user of the administration system 102. In general, a user's ability to share documents can be based on the role or group affiliation of the user. If the user has an administrator or super user role, the user can share any one of the documents in the assigned folder 214 of the local storage area 210. In contrast, the sharing module 212 prevents the user from sharing documents stored in the shared folder 216 of the local storage area 210, which includes documents that have been previously shared with another user of the administration system 102. This policy ensures that a document, after being shared once, cannot be re-shared by the recipient. In some embodiments, a user shares a document in the assigned folder 214 by selecting another user or a group of users for receiving the document. The sharing module 212 can then transmit the information about the selected recipient(s) to the administration system 102. Such information can include the user name and/or group name of the recipient(s) and the name of the document to be shared. The administration system 102, upon receiving the information, assigns the identified document to the intended recipient(s), who can then download the document into the shared folder 216 of their respective user device(s) 104.

In some embodiments, a shared document retains the expiration date of the original parent document. In some embodiments, a shared document does not include any notes upon receipt by the recipient. In some embodiments, the recipient has the ability to create notes for the shared document and submit them to the administration system 102.

The reader module 206 of the application enforces specific rules for reviewing a document from the client application 200. For example, the reader module 206 can permit a user to read a document without providing in-text editing privileges. The reader module 206 can also prohibit the user from printing the document, emailing the document or opening the document using another application installed on the user device 104.

Even though the reader module 206 can prevent a user from embedding notes in a document itself, the user is permitted to make notes for the documents, which are saved by the notes module 208 in a separate file in the local storage area 210. In operation, the notes module 208 allows a user to add and/or edit as many notes per page for as many pages of a document as the user desires. The user can also add and/or edit a general note for the entire document. In addition, the notes module 208 can allow both note types, i.e., the page notes and the general note, to be printed and emailed using the standard print and mail functionalities provided by the user device 104. In addition, the notes module 208 can transmit the notes to the administration system 102 when the document is expired, when the administration system 102 revokes access privilege to the document, or when the user chooses to submit the notes prior to the expiration or revocation.

Moreover, the administration system 102 can keep track of and aggregate the notes received for each document. In some embodiments, the administration system 102 generates a single report including general and page notes. For example, the administration system 102 can aggregate the general and page notes by the name of the user who created the notes, by the name of the document, and/or by page number(s) in a document. In some embodiments, similar general or page notes made by different users for a document can be aggregated with the user names attached to respective general or page notes.

The present invention is advantageous because it provides a mixed-collaborative approach for document review, allowing one user to work together with or independently from other user(s). As an example of an independent approach to document review, notes added through each client application 200 of a user device 104 belong to the individual user. The notes are not embedded in the original document distributed to the user device 104, but are separately stored. As an example of a collaborative approach, the notes can be emailed or shared by one user device 104 with another. The notes can also be centrally aggregated by the administration system 102 after they are submitted to the administration system 104 by individual client applications 200. The administration system 104 can generate a report including the aggregated information. As an example, the report can be made available for a later group discussion outside of the document distribution platform.

Representative Examples

Figure 3:
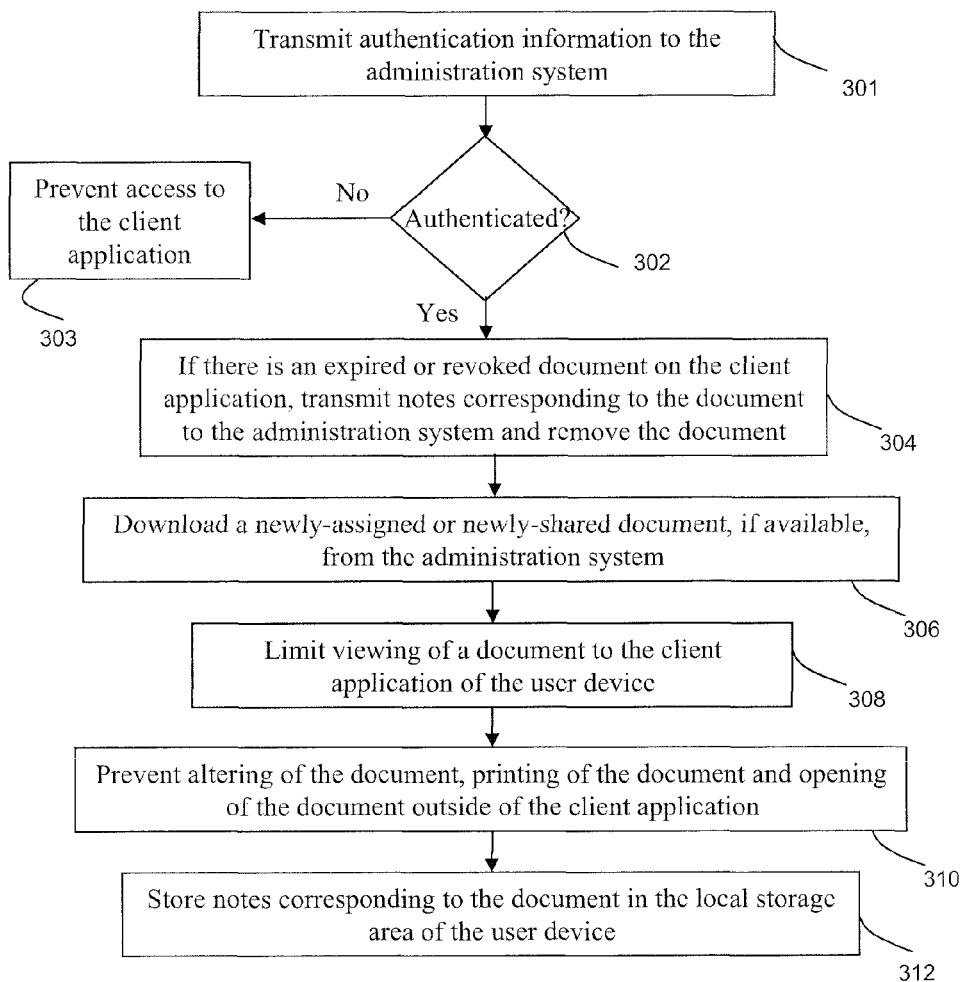
FIG. 3 shows an exemplary flow diagram illustrating a method for operating the client application of FIG. 2.

FIG. 3 shows an exemplary flow diagram illustrating a method for operating the client application of FIG. 2. The process starts with the client application 200 of a user device 104 transmitting authentication information to the administration system 102 over the network 100 (step 301). The authentication information can include the physical device identifier of the user device 104 and identification of the user, such as the user's user name and user pin issued by the administration system 102. The administration system 102 can authenticate the user and the associated user device 104 by comparing the authentication information with reference information stored in the database 120. If the user is not successfully authenticated by the administration system 102 (step 302), the user is prevented from accessing the client application 200 (step 303). Otherwise, after successful user authentication, the administration system 102 determines if the document satisfies a removal criterion, such as if the document is expired or the user's access privilege to the document has been revoked. If this is the case, the administration system 102 can instruct the client application 200 to transmit locally-stored notes associated with the document to the administration system 102, followed by removing the document from the user device 104 (step 304). After successful authentication, the client application 200 is also allowed to download a newly-assigned or newly-shared document to the user device 104 if the document is made available by the administration system 102 (step 306).

Alternatively, the client application 200 can operate in an offline mode independent of the administration system 102. In the offline mode, the user is allowed to access only previously assigned or shared documents already downloaded to the user device 104 after the client application 200 authenticates the user based on the user name and user pin.

During document review, the client application 200 can prevent the user from opening the document in a different application of the user device 104 (step 308). The client application 200 can also prevent the user from altering the document, printing the document or emailing the document (step 310). The user is permitted, however, to create notes for the document that are stored separately from the document in the local storage area 210 (step 312). In some embodiments, the user can instruct the client application 200 to transmit at least a portion of the notes to the administration system 102 prior to the expiration of the document or prior to access privilege of the document being revoked.

Figure 4:
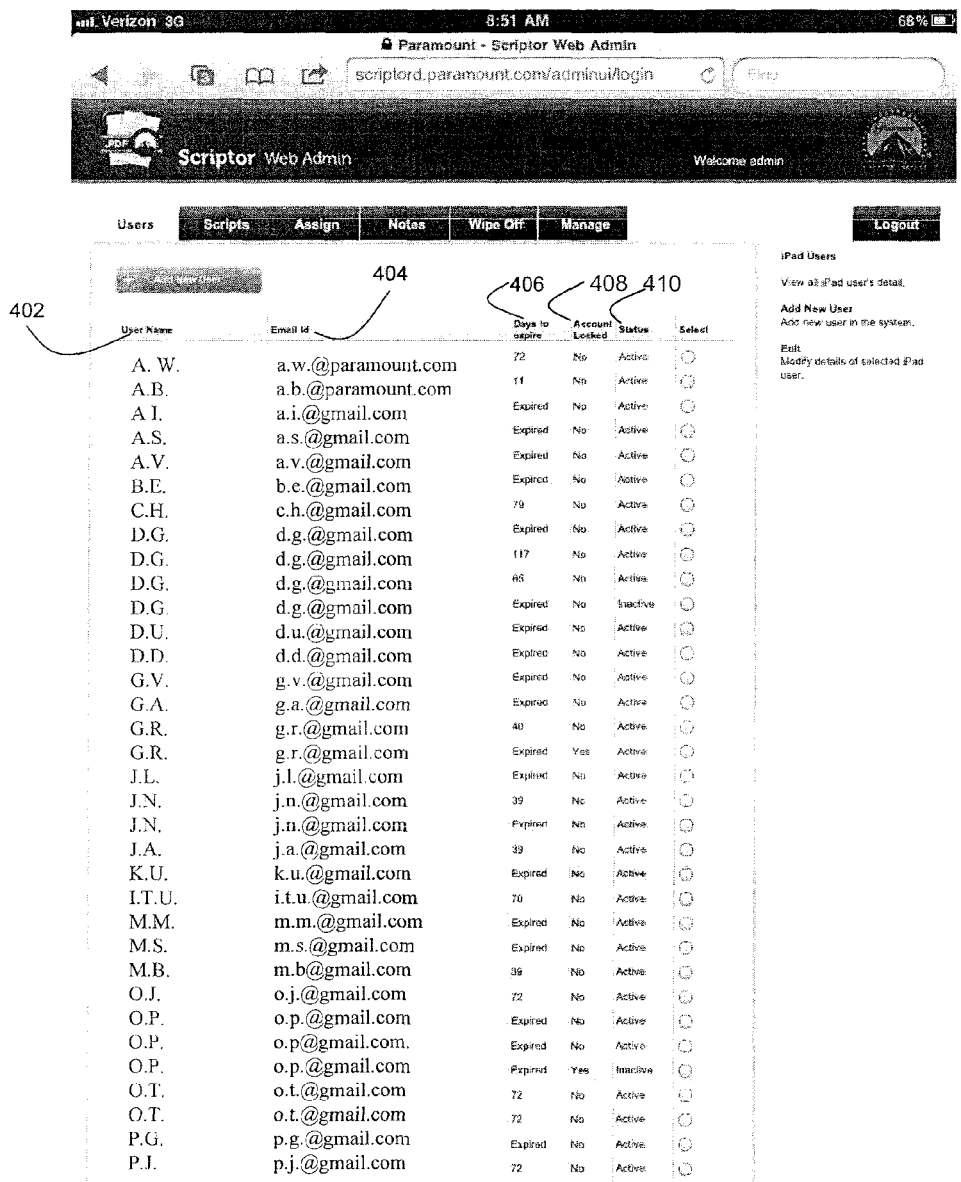
FIG. 4 shows an exemplary administrator interface of the administration system of FIG. 1.

FIGS. 4-8 show various exemplary user interfaces of the administration system 102 of FIG. 2. FIG. 4 shows an exemplary administrator interface that keeps track of a list of users to whom documents have been transmitted. Specifically, the users can be identified by their user names 402 and email addresses 404. In addition, the number of days remaining before each document expires 406 is also displayed. The administration system 102 can set the "account locked" flag 408 of a user account after certain number of unsuccessful attempts by a user to access the account from the corresponding user device 104. Once the "account locked" flag 408 is set, the user is prevented from accessing the client application 200 of the user device 104, even if the user supplies the correct physical device identifier and/or user name and user pin. To reset the "account locked" flag 408, the administration system 102 needs to reset the user pin. In addition, the administrator interface includes a status flag 410 for each user account. The status flag 410, when it is active, indicates that the corresponding user has the privilege to access the client application 200 on his designated user device 104, receive newly-assigned or newly-shared documents from the administration system 102, and submit notes to the administration system 102. The status flag, 410, when it is inactive, indicates that the user has no privilege to access the documents stored in the local storage area 214 and/or local storage area 216 on the user device 104.

Figure 5:
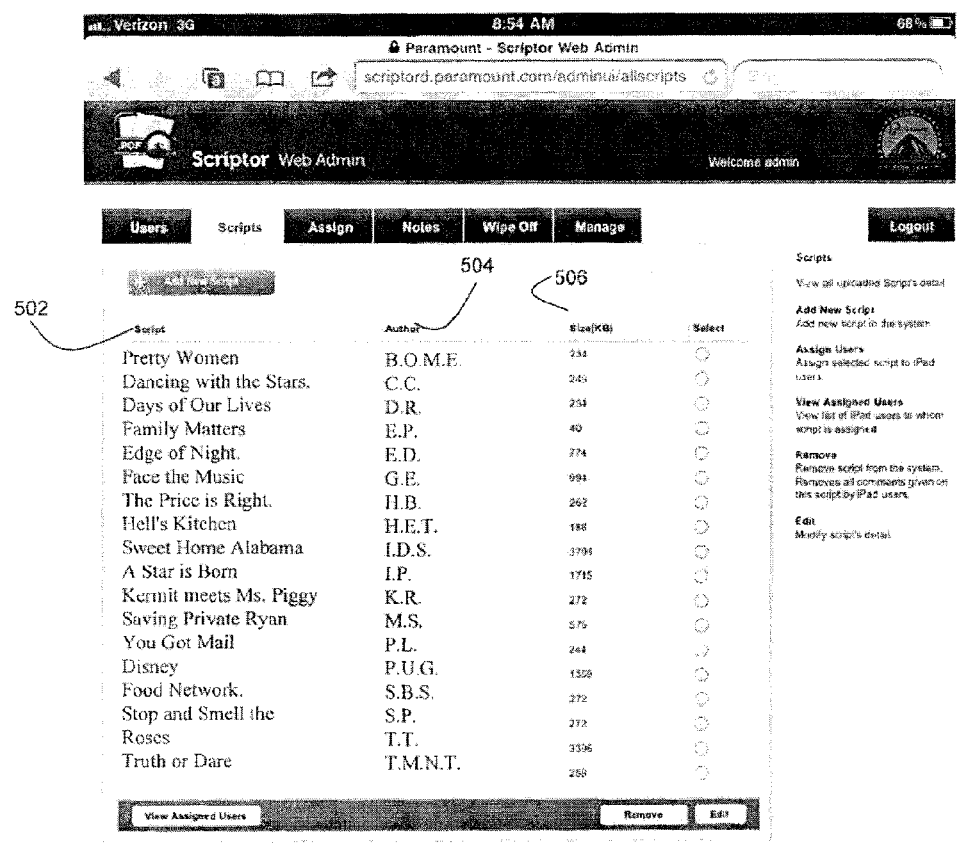

FIG. 5 shows an exemplary administrator interface of the administration system 102 that keeps track of a list of documents that can be distributed to one or more user devices 104. Each document can be identified by its document name 502, author name 504 and size 506.

Figure 6A:
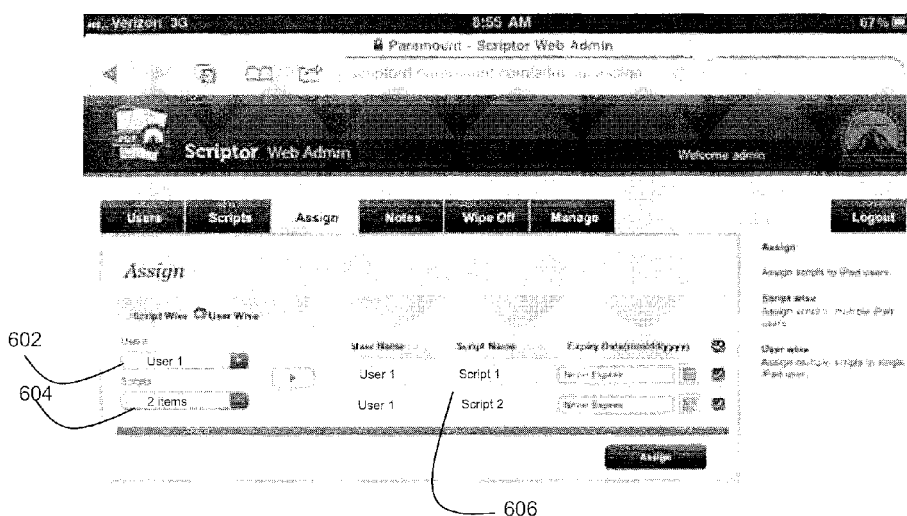
FIGS. 6A and 6B show exemplary assignment interfaces of the administration system of FIG. 1.
Figure 6B:

FIG. 6A shows a "user-wise" assignment interface of the administration system 102, which allows an administrator to assign multiple documents to a single user. The administrator first chooses a user from the drop-down menu 602, after which the administrator selects one or more documents from the drop-down menu 604 for transmission to the user. The drop-down menu 604 can include documents previously not assigned to or shared with the user chosen from the drop-down menu 602. Hence, document selections from the drop-down menu 604 can change dynamically depending on the user selected from the drop-down menu 602. Upon completing an assignment, pertinent assignment information is displayed in the display area 606. The administrator can also select from the display area 606 an expiration date associated with an assigned document. In addition to a specific expiration date, "never expires" may be an option selectable by the administrator. Similarly, FIG. 6B shows a "script-wise" assignment interface of the administration system 102, which allows an administrator to assign a document to multiple users. The administrator first chooses a document from the drop-down menu 608 and then chooses one or more users from the drop-down menu 610 for receiving the document. The drop-down menu 610 can include users previously not assigned to or shared with the document chosen from the drop-down menu 608. Hence, user selections from the drop-down menu 610 can change dynamically depending on the document selected from the drop-down menu 608.

Figure 7:
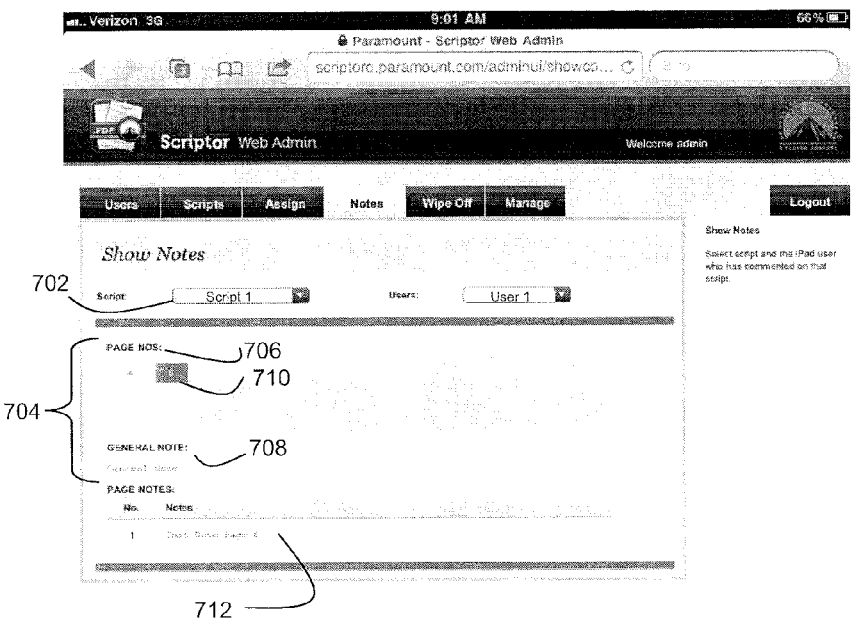
FIG. 7 shows an exemplary notes interface of the administration system of FIG. 1.

FIG. 7 shows an exemplary notes interface of the administration system 102. The administrator can first select a document from the drop-down menu 702. If notes have been submitted by one or more user devices 104 for the selected document, the notes are shown in the region 704. Specifically, general notes are identified in the area 708 of the region 704. Page notes, corresponding to specific pages of the document, are identified in the area 706 of the region 704. In addition, the administrator can select a note from the area 706, such as the highlighted page note 710. In response, the content of the selected note is displayed in the region 712.

Figure 8:
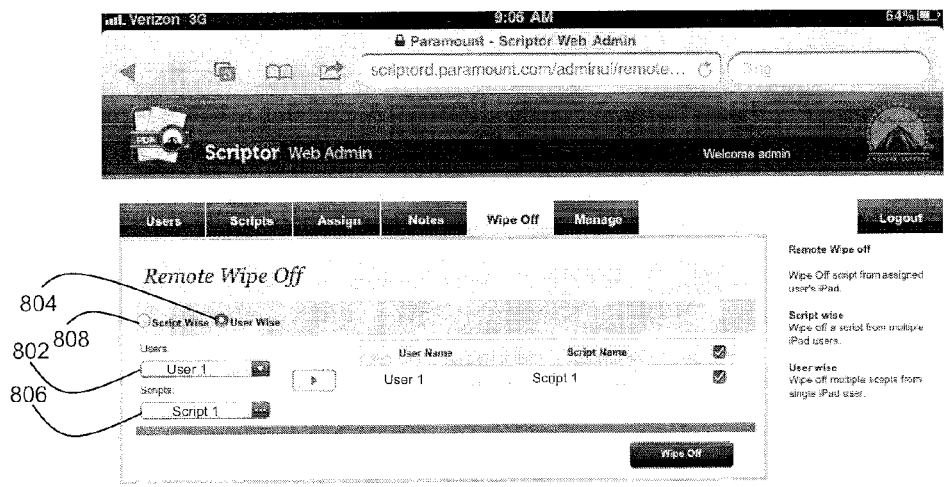
FIG. 8 shows an exemplary wipe-off interface of the administration system of FIG. 1.

FIG. 8 shows an exemplary wipe-off interface of the administration system 102, through which an administrator can choose to remove a document that is already assigned to a user device 104. In some embodiments, the administrator can remove multiple documents from a single user by selecting the "user wise" option 804. Specifically, the administrator first selects a user in the drop-down menu 802 and then chooses one or more documents assigned to the user from the drop-down menu 806 for the purpose of removing the document from the user device 104. In some embodiments, the administrator can remove a document from multiple users by selecting the "script wise" option 808. In particular, the administrator can first select a document from a drop-down menu (not shown) and then chooses one or more users in another drop-down menu (not shown), from whom the document will be removed.

Figure 9:
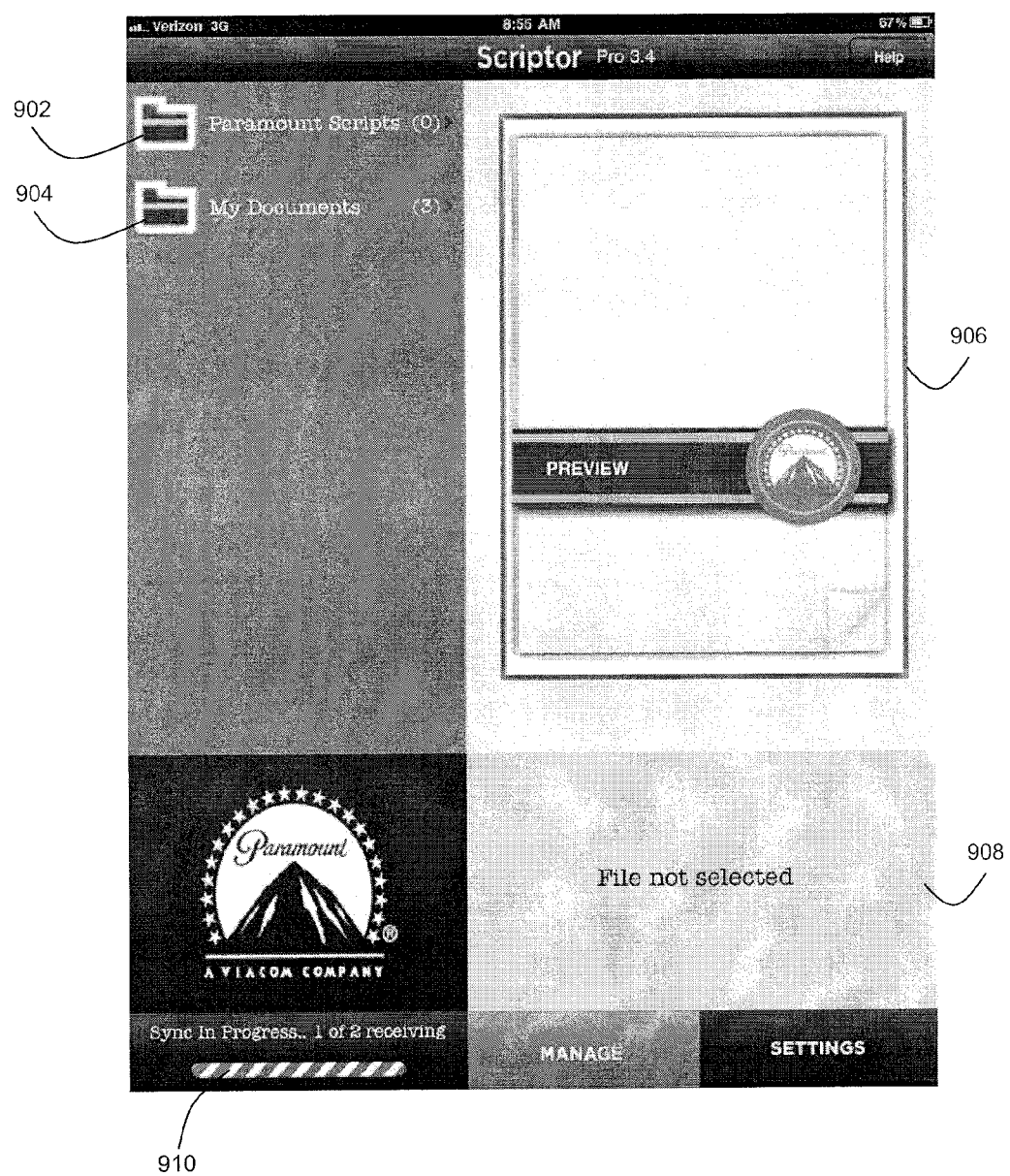
FIG. 9 shows an exemplary user interface of the client application of FIG. 2.

FIGS. 9-12 show various exemplary user interfaces of the client application 200 installed on a user device 104. FIG. 9 shows an exemplary interface of the client application 200 for synchronizing updates, including downloading newly-assigned documents, to the user device 104. The interface includes the assigned folder 902, similar to the assigned folder 214 of FIG. 2, which stores documents that have been assigned to the user by the administration system 102. The interface can include a shared folder (not shown), similar to the shared folder 216 of FIG. 2, which stores documents that have been shared from one user with another user. The interface also includes the My Documents folder 904, similar to the My Documents folder 218 of FIG. 2, for storing documents that are added by the user via a mail program or another application on the user device 104. A user can see a preview of each document in the assigned folder 902, shared folder (not shown), or My Documents folder 904 from the preview area 906. If a document is selected for preview, information related to the document is displayed in the area 908 that provides, for example, the name of the author, the title, the document size, and the expiration date. In some embodiments, the interface provides a status bar 910 to indicate whether a document is being downloaded from the administration system 102 and the progress of the download.

Figure 10:
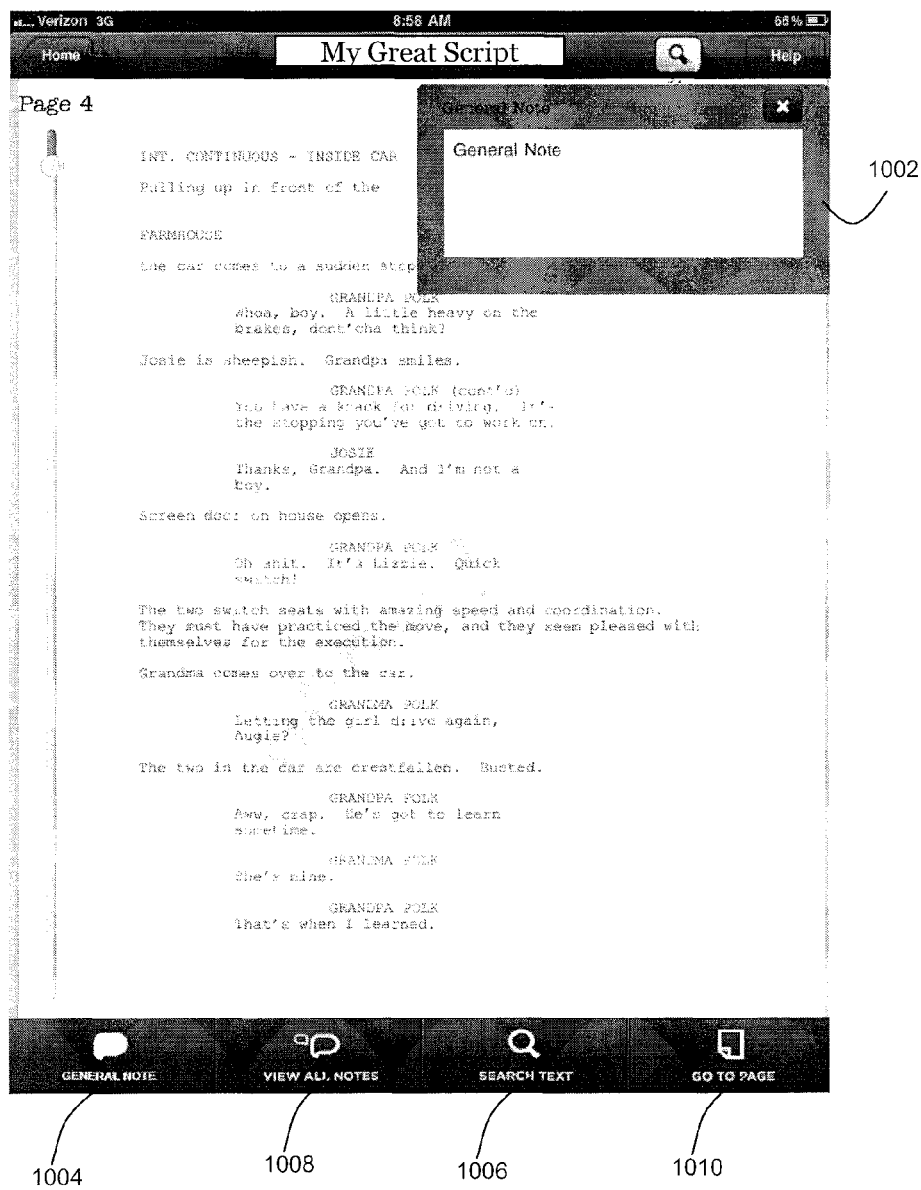
FIG. 10 shows another exemplary user interface of the client application of FIG. 2.

FIG. 10 shows an exemplary interface of the client application 200 for allowing a user to create a general note about a document while displaying the document in a read-only mode. A user can enter a general note in the note region 1002, which can be a hover display that is present as the user scrolls through the document. The user can also minimize the note region 1002. The user can maximize the note region 1002 by selecting the button 1004. The user can resize the note region 1002 by holding and dragging a corner border of the note region 1002 to a desired size or move the note region 1002 to a desired location on the interface. While reviewing the document, the user can search the text of the document by selecting the button 1006 as well as view all existing notes corresponding to the document by selecting the button 1008. In some embodiments, a user can skip to a desired page of the document by selecting the button 1010. The user can create as many page notes per page as desired. For each page note, the user can select the page screen followed by selecting a Page Note option from a pop-up menu (not shown) to a create-note region, similar to the note region 1002, for receiving user entry.

Figure 11:
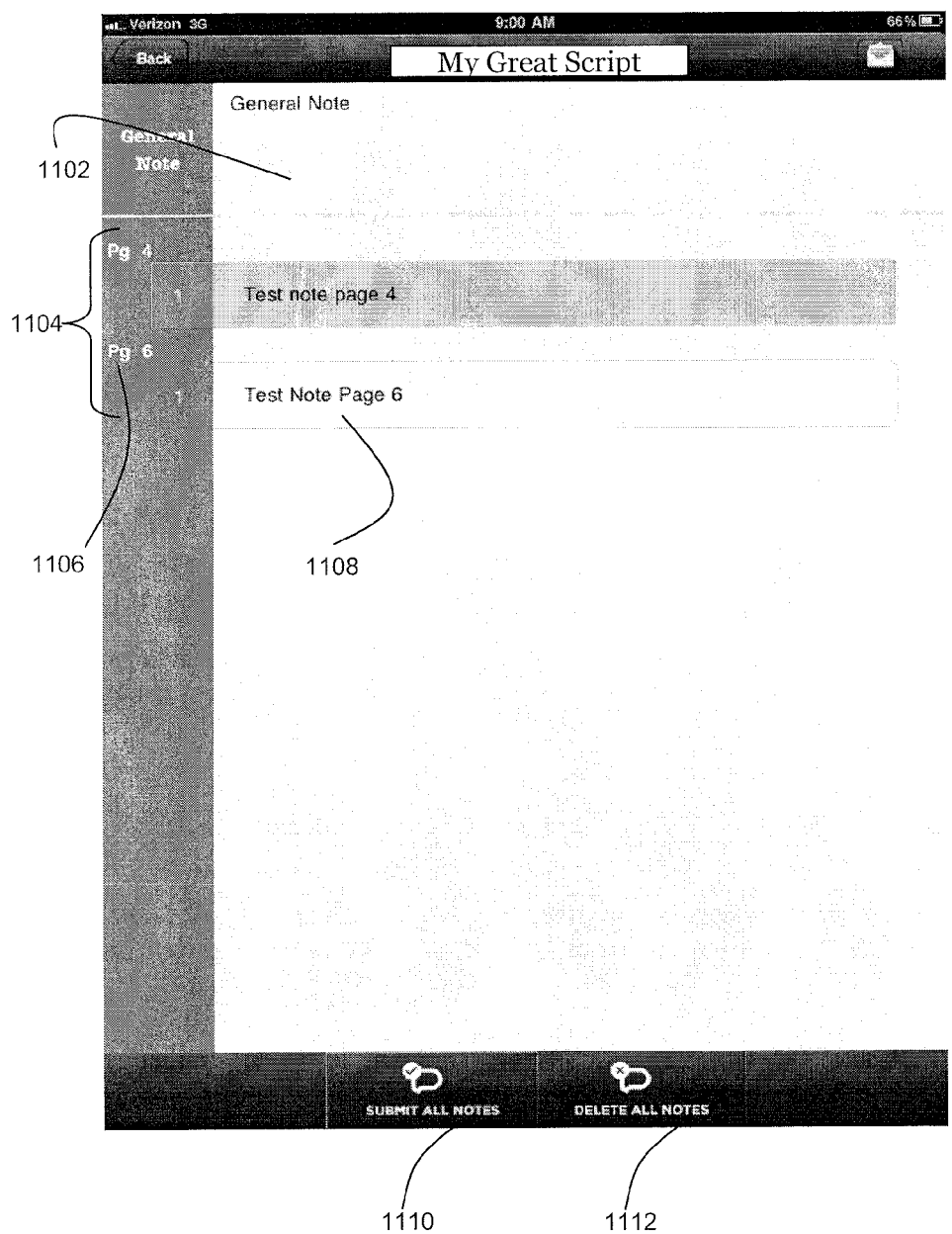
FIG. 11 shows another exemplary user interface of the client application of FIG. 2.

FIG. 11 shows an exemplary interface of the client application 200 that identifies all the notes created for a document. A user can access this interface by selecting the button 1008 of the interface in FIG. 10, for example. The interface of FIG. 11 includes a general notes region 1102 displaying the content of a general note, if available, corresponding to the document. The interface also includes a page notes region 1104 listing each page note by the corresponding document page number 1106 and the content of the page note 1108. The user can submit all of the notes to the administration system 102 by selecting the button 1110. Similarly, the user can delete all of the notes by selecting the button 1112. In some embodiments, the user is presented with options (not shown) to select individual page notes for submission to the administration system 102 or for deletion.

Figure 12:
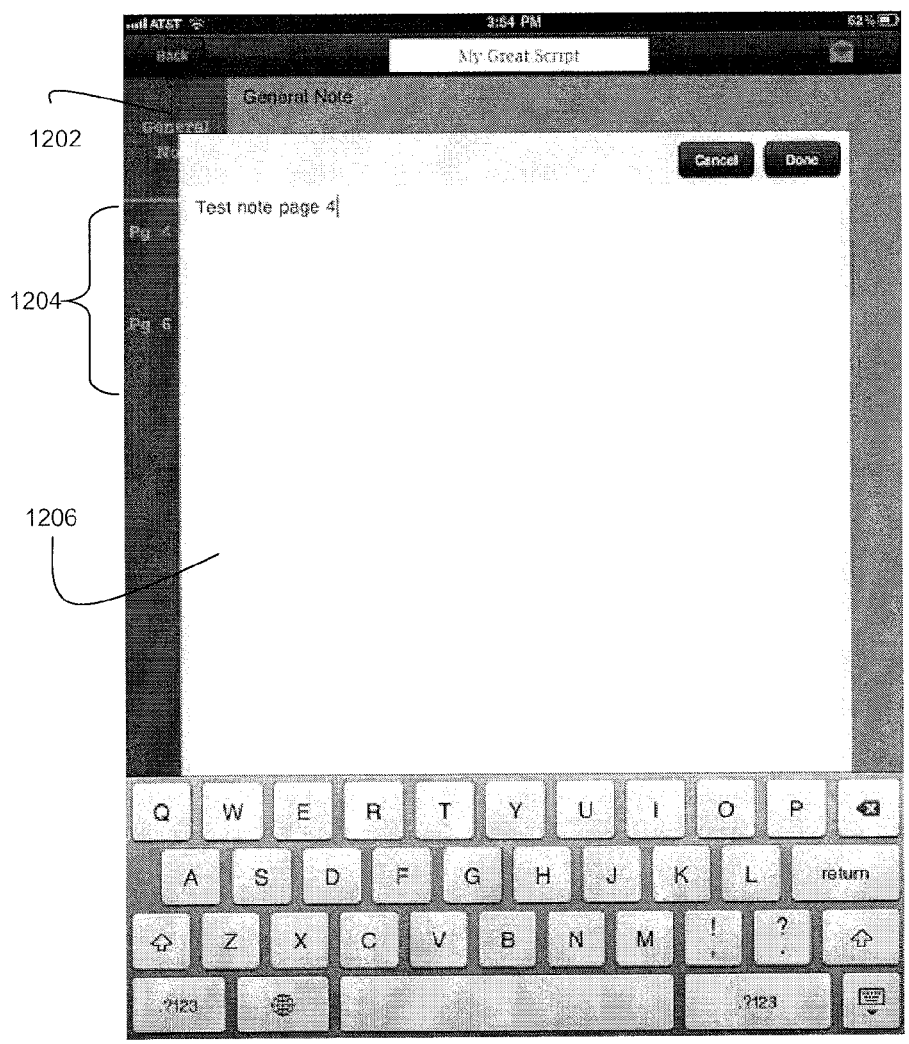
FIG. 12 shows an exemplary interface of the client application that allows a user to edit a note created for a document.

FIG. 12 shows an exemplary interface of the client application 200 that allows a user to edit a note created for a document. The user interface of FIG. 12 is similar to the user interface of FIG. 11, which includes a general notes region 1202 and a page notes region 1204. For each note in the general notes region 1202 or the page notes region 1204, a user can perform in-line editing of the note by, for example, selecting the note to bring forth an editing region 1206. This feature thus allows the user to edit a general or page note after it has been created.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed is:

1. A computer-implemented method for controlling use of a file on a user device, the user device having a client application, the method comprising:
    transmitting, by the user device, authentication information to an administration system, wherein the authentication information includes an identifier of the user device and at least one identification of a user associated with the user device, thereby enabling the administration system to authenticate the user device;
    downloading, by the authenticated user device, the file from the administration system upon successful authentication by the administration system, whereby the downloaded file is securely associated with the client application;
    allowing through the client application of the authenticated user device the at least one identified user associated with the user device to securely access the file during a time when the authenticated user device is disconnected from the administration system, whereby the at least one identified user is an offline user and wherein the securely accessing comprises allowing the client application to access the file when the offline user is authenticated;
    preventing, by the authenticated user device, altering of the file, printing of the file and opening of the file outside of the client application;
    storing, by the authenticated user device, notes corresponding to the file in a local storage area separate from the file;
    transmitting, by the authenticated user device, at least a portion of the notes to the administration system; and
    removing, by the authenticated user device, the file from the authenticated user device as instructed by the administration system.

2. The method of claim 1 further comprising:
    authenticating, by the user device, the at least one identification of the user when the user device is disconnected from the administration system; and
    permitting, by the user device, the user to access a locally-stored copy of the file upon successful authentication by the user device.

3. The method of claim 1, wherein the administration system is adapted to instruct the user device to remove the file after detecting expiration of a time period associated with the file.

4. The method of claim 1, wherein the administration system is adapted to instruct the user device to remove the file when an access privilege of the user in relation to the file is revoked by an administrator of the administration system.

5. The method of claim 1, wherein the transmitted portion of the notes is transmitted to the administration system after the administration system detects i) expiration of a time period associated with the file, or ii) access privilege of the user in relation to the file is revoked.

6. The method of claim 1, wherein the transmitted portion of the notes is transmitted to the administration system as instructed by the user.

7. The method of claim 1 further comprising:
    storing, by the user device, the file in a first folder of the local storage area if the file is assigned to the user device by an administrator of the administration system; and
    storing, by the user device, the file in a second folder of the local storage area if the file is shared with the user by a second user, wherein the user and the second user are in a group defined by the administration system.

8. The method of claim 1 further comprising:
    permitting, by the user device, the user to designate the file for sharing with a second user, wherein the user and the second user are in a group defined by the administration system and the file has not been previously assigned to the second user; and
    transmitting, by the user device, at least one of an identification of the second user or an identification of the predefined group to the administration system such that the administration system is enabled to send the file to the second user.

9. The method of claim 1 wherein the user device is an iPad.

10. The method of claim 1 wherein the file is in a portable document format (PDF).

11. An administration system for controlling use of a file on a user device, the user device having a client application, the administration system comprising:
- a services module, in communication with the user device, for: i) authenticating the user device and one or more user credentials of at least one identified user associated with the authenticated user device, ii) sending the file to the authenticated user device, whereby the file is stored in the authenticated user device and securely associated with the client application, wherein through the client application the at least one identified user is enabled to securely access the file during a time when the authenticated user device is disconnected from the administration system, whereby the at least one identified user is an offline user and wherein the securely accessing comprises allowing the client application to access the file when the offline user is authenticated and preventing altering of the file, printing of the file, and opening of the file outside the client application, iii) receiving in a transmission from the authenticated user device at least a portion of notes stored locally on the authenticated user device corresponding to the file, and iv) removing the file from the authenticated user device upon expiration of a time period associated with the file or when access privilege of the at least one identified user in relation to the file is revoked by an administrator; and
- an application module for managing the file and an account of the at least one identified user.

12. The administration system of claim 11 wherein the application module manages the account of the at least one identified user by performing at least one of: activating the account, setting an identification of the account, generating a watermark associated with the account, locking the account, or deactivating the account.

13. The administration system of claim 11 wherein the application module manages the file by performing at least one of: uploading the file to a database in communication with the administration system, assigning the file to the at least one identified user, assigning the file to a group of users, revoking access privilege of the at least one identified user in relation to the file, revoking access privilege of a group of users in relation to the file, or setting the time period associated with the file.

14. The administration system of claim 11 wherein the application module is further configured to aggregate notes from a plurality of users corresponding to the file and generate a report for the file that includes the aggregated notes, wherein the report is generated without altering the file.

15. The administration system of claim 11 wherein the application module is further configured to manage a group of users by performing at least one of: creating the group, assigning the at least one identified user to the group, removing the at least one identified user from the group, or deleting the group.

16. The administration system of claim 15 wherein the application module is adapted to prevent the at least one identified user from sharing the file with a second user if the second user is not in the same group as the at least one identified user or the file has been previously assigned to the second user.

17. The administration system of claim 11 wherein the application module is further configured to manage one or more user roles by performing at least one of: creating the one or more user roles, defining the one or more user roles, assigning the one or more user roles to the at least one identified user, removing the one or more user roles from the at least one identified user, or deleting the one or more user roles.

18. The administration system of claim 17 wherein the application module is adapted to prevent the at least one identified user from sharing the file with another user if the at least one identified user does not have a sharing role.

19. A computer program product, tangibly embodied in a non-transitory computer readable medium, for controlling use of a file on a user device, the user device having a client application, the computer program product including instructions being operable to cause a data processing apparatus to:
- transmit, by the user device, authentication information to an administration system, wherein the authentication information includes an identifier of the user device and at least one identification of a user associated with the user device, thereby enabling the administration system to authenticate the user device;
- download the file, by the authenticated user device, from the administration system upon successful authentication by the administration system, whereby the downloaded file is securely associated with the client application;
- allow through the client application of the authenticated user device the at least one identified user associated with the user device to securely access the file during a time when the authenticated user device is disconnected from the administration system, whereby the at least one identified user is an offline user and wherein the securely accessing comprises allowing the client application to access the file when the offline user is authenticated;
- prevent, by the authenticated user device, altering of the file, printing of the file and opening of the file outside of the client application; and
- store, by the authenticated user device, notes corresponding to the file in a local storage area separate from the file;
- transmit, by the authenticated user device, at least a portion of the notes to the administration system; and
- remove, by the authenticated user device, the file from the authenticated user device as instructed by the administration system.

20. A user device for controlling use of a file disposed on the user device, the user device including a client application and comprising:
- an authentication module for transmitting authentication information to an administration system, the authentication information including an identifier of the user device and at least one identification of a user associated with the authenticated user device, wherein the authentication module is adapted to download and locally store the file from the administration system upon successful authentication by the administration system;
- a reader module for allowing the client application to provide secure access to the file to the at least one identified user during a time when the authenticated user device is disconnected from the administration system, wherein the at least one identified user is an offline user and whereby the secure access to the file is provided to the offline user when the offline user is authenticated, wherein the reader module prevents altering of the file, printing of the file and opening of the file outside of the client application;
- a notes module for storing notes corresponding to the file in a local storage area and transmitting at least a portion of the notes to the administration system; and
- a sharing module for permitting the at least one identified user to designate the file for sharing with a second user, wherein the user and the second user are in a group defined by the administration system, the file has not been previously assigned to the second user, and the at least one identified user has a sharing role, and wherein the client application is further operable to remove the file from the authenticated user device as instructed by the administration system.

* * * * *